(12) United States Patent
Damgard et al.

(10) Patent No.: US 12,425,383 B2
(45) Date of Patent: Sep. 23, 2025

(54) METHOD FOR AUTHENTICATING A USER TOWARDS A MULTI-NODE PARTY

(71) Applicant: SEPIOR APS, Aarhus C (DK)

(72) Inventors: Ivan Bjerre Damgard, Abyhoj (DK); Thomas Pelle Jakobsen, Marslet (DK); Jakob Illeborg Pagter, Aarhus V (DK); Torben Lauritzen, Aarhus C (DK)

(73) Assignee: BLOCKDAEMON APS, Aarhus C (DK)

( * ) Notice: Subject to any disclaimer, the term of this patent is extended or adjusted under 35 U.S.C. 154(b) by 203 days.

(21) Appl. No.: 18/548,436

(22) PCT Filed: Feb. 9, 2022

(86) PCT No.: PCT/EP2022/053090
§ 371 (c)(1),
(2) Date: Aug. 30, 2023

(87) PCT Pub. No.: WO2022/184391
PCT Pub. Date: Sep. 9, 2022

(65) Prior Publication Data
US 2024/0137353 A1   Apr. 25, 2024
US 2024/0236066 A9   Jul. 11, 2024

(30) Foreign Application Priority Data
Mar. 5, 2021  (EP) .................... 21161033

(51) Int. Cl.
*H04L 9/40* (2022.01)
(52) U.S. Cl.
CPC .................... *H04L 63/08* (2013.01)
(58) Field of Classification Search
CPC ....... G06F 21/30; H04L 9/0825; H04L 9/085; H04L 9/321; H04L 63/04; H04L 63/0407;
(Continued)

(56) References Cited

U.S. PATENT DOCUMENTS 9,769,664 B1 * 9/2017 Kavaler ................. H04L 63/08
2010/0211780 A1 * 8/2010 Mukkara ............. H04L 63/1466
713/168
(Continued)

FOREIGN PATENT DOCUMENTS

WO   2008020991 A2   2/2008
WO   2018022993 A1   2/2018

OTHER PUBLICATIONS

Extended Search Report from corresponding European Application No. 21161033.2, Aug. 24, 2021.
(Continued)

*Primary Examiner* — Gil H. Lee
(74) *Attorney, Agent, or Firm* — Workman Nydegger

(57) ABSTRACT

A method for authentication of a user towards a multi-node party includes at least two nodes. The user contacts the nodes of the multi-node party, via a user application, and each of the nodes of the multi-node party generates a nonce and returns the nonce to the user application. The user application requests authentication from an Identity Provider, based on the nonces received from the nodes of the multi-node party and on a unique identity of the user. The Identity Provider generates a message, based on the request for authentication, and provides the message to the user application. The user application provides the message in a secret form to each of the nodes of the multi-node party. The nodes of the multi-node party verify the message by means of a multi-party verifying operation, and the user is authenticated based on the multi-party verifying operation.

20 Claims, 4 Drawing Sheets

(58) Field of Classification Search
CPC ..... H04L 63/08; H04L 63/0892; H04L 63/12; H04W 12/06
See application file for complete search history.

(56) References Cited

U.S. PATENT DOCUMENTS

2014/0370879 A1\* 12/2014 Redding ........... H04M 3/42178
455/419
2017/0180341 A1\* 6/2017 Walker ................. H04L 9/3242
2019/0273617 A1 9/2019 Maher

OTHER PUBLICATIONS

International Search Report from PCT Application No. PCT/EP2022/053090, May 23, 2022.

\* cited by examiner

METHOD FOR AUTHENTICATING A USER TOWARDS A MULTI-NODE PARTY

FIELD OF THE INVENTION

The present invention relates to a method for authenticating a user towards a multi-node party in a secure manner and with a low number of interactions between the user and an Identity Provider. The method according to the invention further provides a high level of privacy for users applying the method.

BACKGROUND OF THE INVENTION

In most systems with multiple users, authentication, authorization and accountability are core security mechanisms.

In the present context, the term 'authentication' should be interpreted to mean that the user identifies himself or herself towards the system. This could, e.g., be done directly by the user typing a password or presenting a digital signature. Alternatively, so-called federated authentication may be applied, where the user makes use of some third party Identity Provider for proving his or her identity. In this case the user requests authentication from the third party Identity Provider, and the third party Identity Provider returns a certificate, e.g. in the form of an ID token, which may be digitally signed. The user then uses this certificate for proving his or her identity towards the system. Federated authentication may, e.g., be performed by means of an OpenID Connect (OIDC) protocol.

In the present context the term 'authorization' should be interpreted to mean the ability to manage access rights to various parts of the system for various users. This could, e.g., include using an Access Control List (ACL) and/or an Access Control Matrix (ACM).

In the present context the term 'accountability' should be interpreted to mean the ability to keep track of activities performed by various users in the system. This could, e.g., include logging the activities, e.g. in a system log or an audit log.

Some systems comprise multiple nodes, e.g. multiple servers, and a user accessing the system must be authenticated towards at least a minimum threshold number of the nodes. This improves the security and reliability of the system, because none of the nodes constitutes a single point of trust, and a malicious party would need to compromise several nodes in order to gain unauthorized access to the system. However, this requires that the user performs an authentication process with respect to each of the nodes, and this results in a lengthy authentication process which degrades the user experience.

Furthermore, each of the nodes may gain knowledge of the user ID of the user. This may, e.g., be used for inferring information regarding the behaviour of the user, and potentially linking the user ID to the true identity of the user. This introduces a risk that the privacy of the user may be breached or compromised.

WO 2008/020991 A1 discloses a method that provides notarized federated identity management, in which direct communication between identity providers and service providers is avoided. Upon receiving a service request, a service provider may open a secure channel with the user. The service provider and the user may jointly generate a random session_ID for the user's request. The identity provider is given the session_ID by the user in a secure channel, after successful authentication. An assertion associated with the user may be generated by the identity provider with a hashed version of the session_ID. To prevent information leaking, the assertion may be blinded by the identity provider before it is signed and submitted to a notary service. When submitting assertions, an identity provider may first authenticate to the notary server, which ensures the identity provider is authorized. In response to a query by the user, the notary server may return a notarized blinded assertion to the user. The user may pass the notarized blinded assertion on to the service provider who then unblinds and verifies the notarized assertion. The method disclosed in WO 2008/020991 A1 relates purely to authentication towards a single-node party.

DESCRIPTION OF THE INVENTION

It is an object of embodiments of the invention to provide a method for authenticating a user towards a multi-node party, in which the authentication is performed in an easy and user friendly, yet secure manner.

It is a further object of embodiments of the invention to provide a method for authenticating a user towards a multi-node party, in which a high level of privacy for users is obtained.

According to a first aspect the invention provides a method for authentication of a user towards a multi-node party, the multi-node party comprising at least two nodes, the method comprising the steps of:

the user contacting the nodes of the multi-node party, via a user application, each of the nodes of the multi-node party generating a nonce and returning the nonce to the user application, the user application requesting authentication from an Identity Provider, based on the nonces received from the nodes of the multi-node party and on a unique identity of the user, the Identity Provider generating a message, based on the request for authentication, and providing the message to the user application, the user application providing the message in a secret form to each of the nodes of the multi-node party, the nodes of the multi-node party verifying the message, based on the received secret form of the message and by means of secure multi-party computation (MPC), and authenticating the user based on the secure multi-party computation.

Thus, the invention provides a method for authenticating a user towards a multi-node party, i.e. towards a party which comprises at least two nodes.

According to the method, a user initially contacts the nodes of the multi-node party, via a user application. The user application may have a user interface and an interface towards the multi-node party. The user interface could, e.g., be a graphical user interface (GUI). The interface towards the multi-node party could, e.g., be in the form of a software development kit (SDK).

In response to being contacted by the user, each node of the multi-node party generates a nonce and returns the nonce to the user application. Accordingly, the user application is in the possession of nonces originating from each of the nodes of the multi-node party, the nonces being generated upon request from the user.

Next, the user application requests authentication from an Identity Provider, based on the nonces received from the nodes of the multi-node party and on a unique identity of the user.

In response thereto, the Identity Provider generates a message and provides the message to the user application. The message is generated based on the request for authentication, and thereby based on the nonces generated by the nodes of the multi-node party, as well as on the unique identity of the user. Thus, the message is associated with the nodes of the multi-node party, with the specific session as well as with the user.

Accordingly, the user only contacts the Identity Provider once, on behalf of all of the nodes, in order to request authentication, i.e. a separate authentication process for each node is not required.

In prior art methods, when a user application requests authentication from an Identity Provider, thereby engaging in an authentication process with the Identity Provider, the user is typically required to navigate to a specific web page, enter a password on a keyboard, provide a fingerprint, and/or generate a one-time password using a USB token. As a result of this, the user application obtains a message, e.g., in the form of an ID token. The user can provide this message to another party to prove his/her identity to that party. With known techniques the user cannot safely send the same message to each of the nodes. This would be insecure, because a malicious node could forward the message to another node, thereby impersonating the user. To securely prove his/her identity to a multi-node party with known techniques, the user must therefore instead engage in multiple separate authentication processes, one process for each node, in order to obtain separate messages for each of the nodes. This would, in turn, degrade the user experience, because the user must then, e.g., enter his/her password once for each node instead of only once. According to the present invention, the user can safely engage in just a single authentication process with the Identity Provider, on behalf of all the nodes, in order to prove his/her identity to each of the nodes in the multi-node party, and thereby the user experience is not degraded.

The message could, e.g., be in the form of an ID token verifying the identity of the user, preferably an ID token provided with a digital signature which confirms the validity of the ID token. In this case, verifying the message, as described in further detail below, may include verifying that the digital signature is a valid signature of the ID token.

Upon receipt of the message, the user application provides the message in secret form to each of the nodes of the multi-node party. For instance, the message may be provided in encrypted form to the nodes and/or the message may be shared among the nodes of the multi-node party. This will be described in further detail below. In any event, none of the nodes receives the entire message in a non-secret form, but the nodes of the multi-node party are able to verify the message via a multi-party operation, such as secure multi-party computation (MPC).

Thus, the nodes of the multi-node party verify the message, based on the received secret form of the message and by means of a multi-party verifying operation.

Finally, the user is authenticated based on the multi-party verifying operation. The step of authenticating the user may form part of the step of the nodes verifying the message. In this case, the authentication is an integrated part of the multi-party verifying operation, and the outcome of the verifying operation is the authentication of the user. The multi-party operation may, e.g., be a secure multi-party calculation (MPC), which is well known in the art.

In the present context the term 'multi-party verifying operation' should be interpreted to mean an operation which has the purpose of verifying that a message is correct, and which is performed by the two or more nodes in cooperation. Accordingly, none of the nodes is able to perform the verification on its own, and none of the nodes will obtain information regarding the message which will turn the node into a single point of trust.

Thus, since the verification, and thereby the authentication of the user, takes place via a multi-party verifying operation, such as secure multi-party computation, among the nodes of the multi-node party, none of the nodes obtains knowledge regarding the entire message or the real identity of the user. This preserves the privacy of the user and minimises the risk that an unauthorised, or even malicious, party gains access to the message, including the true identity of the user.

Furthermore, this is obtained without requiring that the user authenticates separately towards each of the nodes. This is due to the fact that the user application requests authentication from the Identity Provider based on all of the nonces received from all of the nodes, that one message is generated based on all of the nonces, and that the message is subsequently verified by the nodes in combination, i.e. by means of a multi-party verifying operation. Thus, for the user the process feels as if the authentication took place towards a single-node party, and not towards a multi-node party, and the usability and user experience is therefore significantly improved as compared to prior art authentication processes towards multi-node parties.

The method may further comprise the step of the Identity Provider encrypting the message, and providing the encrypted message to the user application, and the step of the user application providing the message in a secret form may comprise providing the encrypted message to the nodes of the multi-node party.

According to this embodiment, the secret form of the message is an encrypted form of the message. More particularly, the message is encrypted by the Identity Provider, and the message is provided from the Identity Provider to the user application in an encrypted form, i.e. the message is already in a secret form when it is received by the user application. The user application then simply forwards the encrypted message to each of the nodes of the multi-node party, i.e. all of the nodes receive the same encrypted message. The nodes are able to decrypt at least part of the encrypted message when at least some of the nodes are working together in a multi-party decryption operation. However, none of the nodes are able to decrypt the message on their own. The multi-party decryption operation may be subject to a threshold condition allowing a subset of a minimum number of nodes to decrypt the message.

The method may further comprise the step of the nodes of the multi-node party generating a shared encryption key, and the step of encrypting the message and the step of verifying the encrypted message may be performed by means of the shared encryption key.

The generated key may comprise a public key and a private key which is shared among the nodes of the multi-node party. The public key may be provided to the Identity Provider, e.g. along with the request for authentication, or in a separate step prior to requesting authentication. During the verification process, the nodes of the multi-node party decrypt the encrypted message, using their shares of the secret key, and by means of a multi-party decryption operation, such as secure multi-party computation. The verification is performed as part of this multi-party decryption operation. Thereby none of the nodes of the multi-node party comes into the possession of the entire decrypted message.

The shared key may, e.g., be generated by means of a multi-party operation, i.e. an operation in which at least some of the nodes cooperate, and it may be secret-shared among the nodes of the multi-node party.

As an alternative, the encryption key may be generated in any other suitable manner, and possibly by another entity than the multi-node party.

The method may further comprise the step of decrypting the received message at the multi-node party, by means of a multi-party decryption operation, such as secure multi-party decryption. As described above, this may be performed by means of a secret decryption key which is shared among the nodes of the multi-node party, and possibly subject to a threshold condition.

Alternatively or additionally, the step of the user application providing the message in a secret form to each of the nodes of the multi-node party may comprise the user application generating a sharing of the message, and providing at least one share of the message to each of the nodes of the multi-node party, and the step of the nodes of the multi-node party verifying the message may be performed based on the received shares.

According to this embodiment, the secret form of the message is in the form of a sharing of the message among the nodes of the multi-node party. Thus, even if the user application receives the message in a non-secret form, none of the nodes receives the entire message, and thereby none of the nodes obtains knowledge regarding the entire message, including knowledge regarding the true identity of the user. However, the nodes are able to reconstruct the message by means of a multi-party operation, based on their respective shares of the message, and possibly subject to a threshold condition.

The method may further comprise the step of storing at least part of the message at the multi-node party, in the form of a secret sharing of at least part of the message.

According to this embodiment, the message, or at least a part of the message, is stored at the multi-node party after the authentication of the user. However, this is done in the form of a secret sharing among the nodes of the multi-node party, and thereby none of the nodes is in the possession of the entire stored part of the message. Accordingly, the privacy of the user is maintained, and none of the nodes will constitute a single point of trust.

The entire message may be stored in this manner. As an alternative, only part of the message may be stored. For instance, in the case that the message is in the form of an ID token provided with a digital signature, then only the ID token may be stored, and not the digital signature.

The method may further comprise the steps of:
each node of the multi-node party generating a session ID and returning the session ID to the user application along with the nonce,
for each of the nodes of the multi-node party, the user application providing the session ID generated by a given node of the multi-node party along with the share(s) of the message provided to that node, and
each node verifying the received session ID.

According to this embodiment, each of the nodes of the multi-node party is able to ensure that a received secret version of a message is in fact related to a nonce generated by the node. This is obtained by each node generating a session ID and returning this session ID to the user application along with the generated nonce. When the secret form of the message is later provided to the nodes by the user application, the user application includes the respective session IDs. A given node is thereby able to verify that the session ID which is provided by the user application along with the secret form of the message is indeed identical to the session ID which was provided from the node to the user application along with the nonce. This reduces the risk that a fraudulent party gains access to the multi-node party by means of a false identification message.

For instance, each node may store the session ID along with the generated nonce, and the node may only verify the received message if there is a match between the stored session ID and the returned session ID, and if it can be verified that the message was generated based on the stored nonce.

The nodes may check the validity of the received secret form of the message in other ways. For instance, the user application may forward the request for authentication to the Identity Provider via a specific connection, e.g. a Transport Layer Security (TLS) connection, and the message received from the Identity Provider may only be accepted as valid if it is provided via the same connection.

As an alternative, the multi-node party may generate a message authentication code based on the nonce and forward this to the user application. The message authentication code must be returned along with the message, and the message is only accepted as valid if the returned message authentication code is consistent with the nonce which was used for generating the message.

In any of the above scenarios, it is ensured that the message provided to the user application by the Identity Provider is returned to the multi-node party by the same user who initially contacted the nodes of the multi-node party, via the user application.

The method may further comprise the step of granting or denying access for the user to an object stored at a storage location which is accessible to the multi-node party, based on the authentication of the user and based on a set of access rights.

According to this embodiment, a user is granted access to an object if he or she is appropriately authenticated, and if the set of access rights specifies that the authenticated user has the right to access the object. On the other hand, if the user is not authenticated, then the user will not be granted access to any of the objects stored at the storage location. Furthermore, if a user is authenticated he or she will still only be granted access to a given object to the extend which the set of access rights specifies.

The set of access rights may, e.g., be in the form of an access control list (ACL) or an access control matrix (ACM), specifying which users are authorized to perform which actions with respect to which objects.

The storage location may form part of the multi-node party, or it may be a separate storage location. In the latter case the multi-node party merely administers the access for users to the storage location, and thereby to the objects stored at the storage location.

The set of access rights may, e.g., specify that a given user is authorised to define access rights for other users to the objects stored at the storage location. This would allow a user to delegate access rights to other users.

The method may further comprise the steps of:
deriving a sharing of a unique ID of the user from the message, and storing shares of the unique ID of the user at the nodes of the multi-node party and by means of a multi-party storing operation, and
each node logging activities of the user and storing the logged activities along with the respective share(s) of the unique user ID.

As described above, the message received from the Identity Provider may be in the form of an ID token provided with a digital signature. In this case the ID token may contain a unique ID of the user, and this can be derived from the message and stored at the multi-node party in the form of a sharing, such as a secret sharing, among the nodes.

In any event, each of the nodes is in the possession of a share of the unique ID of the user, but none of the nodes is in the possession of, or has obtained knowledge about, the entire unique ID of the user. However, the unique ID of the user is derivable from the shares held by the nodes, and by using a multi-party operation, i.e. an operation in which the nodes cooperate.

When the user has been granted access to the system, due to successful authentication, the nodes of the multi-node party log activities performed by the user. Each node further associates the logged activities to the share(s) of the unique ID of the user which the node is in the possession of, in the sense that it stores the logged activities along with the respective share(s). Accordingly, each node holds a record of logged activities, the logged activities being linked to the user performing the activities, via the respective share(s) of the unique user ID, but without the real identity of the user being revealed to the individual nodes.

The method may further comprise the steps of:
an auditor retrieving activity information from the nodes of the multi-node party by means of a multi-party operation, and
the auditor performing audit of activities performed at the multi-node party, based on the retrieved information.

According to this embodiment, an auditor gains access to the logged user activities which were stored by the nodes along with their respective shares of the unique ID of the user. This is done by means of a multi-party operation, which allows the auditor to link the logged activities to the real identity of the user, based on the stored shares of the unique ID of the user. The auditor is then able to perform relevant audit of the activities performed at the multi-node party, based on the activity information retrieved in this manner. Again, this is done without revealing the real identity of the user to any of the nodes.

The retrieved activity information may be in the form of a complete activity log for a given user, or even for all users which have had access to the multi-node party during a specified time interval. The retrieved activity information may originate from a single session of a given user, or it may originate from several sessions of the same user.

As an alternative, the retrieved activity information may be in a limited form, i.e. only a part of the stored activity information is made available to the auditor. For instance, the auditor may only be allowed to retrieve responses to specific queries. For example, the auditor may query whether a specific user, or a specific group of users, has accessed one or more specified objects and/or performed one or more specified activities within a given time period. The response to such a query may simply be 'yes' or 'no'. This would allow the auditor to retrieve relevant activity information for auditing and/or statistical purposes, without obtaining detailed information regarding the users, including detailed information regarding the real identities of the users, and/or regarding activities of individual users. As an alternative, the auditor may retrieve only a specified subset of the logged activities for a specified user or a specified group of users.

The method may further comprise the steps of:
generating a pseudonym user ID and storing the pseudonym user ID at the multi-node party and by means of a multi-party storing operation,
logging activities of the user and associating the activities and the pseudonym user ID to each other, and
each node providing information regarding node ID, pseudonym user ID and associated activities to a log.

According to this embodiment, the logged activities are associated with the pseudonym user ID, rather than with the real user ID. Thereby the nodes of the multi-node party will not be able to directly link the logged activities to the real identity of the user performing the activities. Furthermore, in the case that a new pseudonym user ID is generated each time a user accesses the system, the nodes will also not be able to link activities performed during two different sessions to the same user. This improves the privacy of the users.

The pseudonym user ID may be stored by means of a multi-party storing operation, in a manner which links it to the unique ID of the user, in which case it will be possible to link activities associated to a pseudonym user ID to the unique ID of the user, and thereby to the real identity of the user, by applying an appropriate multi-party operation.

Thus, according to this embodiment, each node provides information regarding node ID, pseudonym user ID and associated activities to a log. The log could, e.g., be a system log or an audit log. Accordingly, the log contains activity information provided by each of the nodes, and the activity information is associated to the node ID of the node which logged the activities, and to the pseudonym user ID of the user which performed the activities.

Another party, e.g. an auditor, may subsequently access the log in order to retrieve at least part of the logged information. The auditor may be provided with a key which allows the auditor to link the pseudonym user ID's to the unique user ID's. The key could, e.g., be provided by the multi-node party. Thereby the auditor is able to derive information regarding activities performed by a given user during multiple sessions, based on a mapping between the pseudonym user ID's and the unique user ID's, even though this information is not available directly from the information stored in the log. In this case the auditor would not need to apply a multi-party operation each time activity information is retrieved from the log.

The step of the user application requesting authentication from an Identity Provider may comprise the steps of:
the user application requesting authentication of the user from a first Identity Provider, based on the nonces received from the nodes of the multi-node party and on a unique identity of the user,
the first Identity Provider generating a first message, based on the request for authentication and providing the first message to the user application,
the user application requesting authentication of the user from a second Identity Provider, based on the first message received from the first Identity Provider and on a unique identity of the user, and
the second Identity Provider generating a second message, based on the request for authentication and providing the second message to the user application.

According to this embodiment, the security of the system is improved by requesting authentication from an Identity Provider several times, in a 'chained' process. More particularly, the user application initially requests authentication of the user from a first Identity Provider, based on the nonces received from the nodes of the multi-node party and on a unique identity of the user, and the first Identity Provider generates a first message, based thereon, and provides the message to the user application, in the manner described above. However, instead of providing the received first message in a secret form to each of the nodes of the multi-node party, the user application request authentication of the user from a second Identity Provider, based on the first message and on the unique identity of the user. Accordingly, the first message, which was generated by the first Identity Provider, is applied in an additional request for authentication of the user, from the second Identity Provider, in a manner which is similar to how the nonces provided by the nodes of the multi-node party were applied during the first request for authentication.

In response to the second request for authentication of the user, the second Identity Provider generates a second message and provides the second message to the user application. Accordingly, the user application is now in the possession of the first message generated by the first Identity Provider as well the second message generated by the second Identity Provider. Furthermore, the second message was generated on the basis of the first message, and therefore contains information regarding the first message, and thereby regarding the first authentication of the user which was provided by the first Identity Provider.

The user application then provides the first message as well as the second message in a secret form to the nodes of the multi-node party, essentially in the manner described above. It is, however, not ruled out that only the second message is provided to the user application.

The step of the user application requesting authentication from an Identity Provider may further comprise the user application requesting authentication of the user from at least a third Identity Provider, based on the second message and on a unique identity of the user, thereby creating a chain of messages.

According to this embodiment, authentication is sequentially requested from three or more Identity Providers, essentially in the manner described above, thereby further improving the security of the system. The user application provides two or more, and preferably all of the received messages in a secret form to the nodes of the multi-node party. This may be done in the form of a single message, e.g. a hashed or concatenated message formed from the messages received from the Identity Providers. Alternatively, the messages may be provided separately to the nodes of the multi-node party. In this case the user application may provide the messages to the nodes when these are received from the respective Identity Providers, rather than awaiting receipt of the last message.

It is not ruled out that the first, second, third, etc. Identity Provider is in fact the same Identity Provider, as long as a received message is applied when the next request for authentication is set forth.

As an alternative, the step of the user application requesting authentication from an Identity Provider may comprise the steps of:
the user application requesting authentication of a first user from the Identity Provider, based on the nonces received from the nodes of the multi-node party and on a unique identity of the first user,
the Identity Provider generating a first message, based on the request for authentication of the first user and providing the first message to the user application,
the user application requesting authentication of a second user from the Identity Provider, based on the first message received from the Identity Provider and on a unique identity of the second user, and
the Identity Provider generating a second message, based on the request for authentication of the second user and providing the second message to the user application.

This is similar to the embodiment described above, and the remarks set forth above are therefore equally applicable here. However, according to this embodiment, rather than requesting authentication of one user at multiple Identity Providers, authentication of multiple users is requested at the Identity Provider. This could, e.g., be relevant in the case that actions to be performed, e.g. accessing an object, providing a digital signature, performing a transaction, etc., requires approval from multiple users.

Similarly to the embodiment described above, the step of the user application requesting authentication from an Identity Provider may further comprise the user application requesting authentication of at least a third user from the Identity Provider, based on the second message and on a unique identity of the third user, thereby creating a chain of messages.

It is not ruled out that authentication of the users is requested from multiple Identity Providers. For instance, authentication of the first user may be requested from a first Identity Provider, authentication of the second user may be requested from a second Identity Provider, which is not the same as the first Identity Provider, etc.

An advantage of this and the above embodiment is that the chain of ID tokens can be produced without the Identity Provider(s) deviating from a regular authentication flow with a single user and a single Identity Provider.

According to a second aspect the invention provides a method for authentication of a user towards a multi-node party, the multi-node party comprising at least two nodes, the method comprising the steps of:
the user contacting the nodes of the multi-node party, via a user application,
each of the nodes of the multi-node party generating a nonce and returning the nonce to the user application,
the user application generating a combined nonce, based on the nonces received from the nodes of the multi-node party, and requesting authentication from an Identity Provider based on the combined nonce and on a unique identity of the user,
the Identity Provider generating a message, based on the request for authentication, and providing the message to the user application,
the user application providing the message to each of the nodes of the multi-node party,
the nodes of the multi-node party verifying the message, based on the received message and by means of a verifying operation, and
authenticating the user based on the verifying operation.

The method according to the first aspect of the invention is similar to the method according to the second aspect of the invention, and similar features will therefore not be described in detail here. Accordingly, the remarks set forth above with reference to the first aspect of the invention are equally applicable to the second aspect of the invention.

In the method according to the second aspect of the invention, the user initially contacts the nodes of the multi-node party, via a user application, essentially as described above with reference to the first aspect of the invention.

In response thereto, each of the nodes of the multi-node party generates a nonce and returns the nonce to the user application, essentially as described above with reference to the first aspect of the invention.

The user application then generates a combined nonce, based on the nonces received from the nodes of the multi-node party. Thus, the combined nonce includes information from each of the nonces which were generated by the nodes of the multi-node party. The user application further requests authentication from an Identity Provider based on the combined nonce an on a unique identity of the user. This is similar to what is described above with reference to the first aspect of the invention. The combined nonce may, e.g., be generated by concatenating the individual nonces or by hashing the nonces.

Next, the Identity Provider generates a message, based on the request for authentication, and thereby based on the combined nonce and on the unique identity of the user. As described above with reference to the first aspect of the invention, the message may be in the form of an ID token provided with a digital signature. In any event, the message reflects the combined nonce, in the sense that it depends on the combined nonce, and thereby also the nonces which were generated by the nodes of the multi-node party. However, the communication between the user application and the Identity Provider takes place in a manner which resembles a situation where only one party requests authentication, due to the combined nonce. In other words, each node need not request authentication of the user from the Identity Provider, thereby reducing the number of required actions, and improving the user experience. Furthermore, from the perspective of the Identity Provider, the process is similar to performing authentication towards a single node party.

The Identity Provider provides the message to the user application, and the user application provides the message to the each of the nodes of the multi-node party. The nodes of the multi-node party then verify the message, based on the received message and by means of a verifying operation. Since the message was generated based on the combined nonce, which was in turn created from the nonces which were generated by the nodes of the multi-node party, each node is able to check whether or not the message corresponds to the nonce which the node initially provided to the user application.

Finally, the user is authenticated based on the verifying operation.

Thus, authentication of the user is obtained in a secure manner, since the authentication takes place towards a multi-node party, but without introducing the additional steps of each node requesting authentication from the Identity Provider, and thereby in a user friendly manner.

The step of the user application requesting authentication from an Identity Provider may comprise the steps of:
the user application requesting authentication of the user from a first Identity Provider, based on the combined nonce and on a unique identity of the user,
the first Identity Provider generating a first message, based on the request for authentication and providing the first message to the user application,
the user application requesting authentication of the user from a second Identity Provider, based on the first message received from the first Identity Provider and on a unique identity of the user, and
the second Identity Provider generating a second message, based on the request for authentication and providing the second message to the user application.

This has already been described in detail above with reference to the first aspect of the invention.

The step of the user application requesting authentication from an Identity Provider may further comprise the user application requesting authentication of the user from at least a third Identity Provider, based on the second message and on a unique identity of the user, thereby creating a chain of messages.

This has already been described in detail above with reference to the first aspect of the invention.

As an alternative, the step of the user application requesting authentication from an Identity Provider may comprise the steps of:
the user application requesting authentication of a first user from the Identity Provider, based on the combined nonce and on a unique identity of the first user,
the Identity Provider generating a first message, based on the request for authentication of the first user and providing the first message to the user application,
the user application requesting authentication of a second user from the Identity Provider, based on the first message received from the Identity Provider and on a unique identity of the second user, and
the Identity Provider generating a second message, based on the request for authentication of the second user and providing the second message to the user application.

This has already been described in detail above with reference to the first aspect of the invention.

The step of the user application requesting authentication from an Identity Provider may further comprise the user application requesting authentication of at least a third user from the Identity Provider, based on the second message and on a unique identity of the third user, thereby creating a chain of messages.

This has already been described in detail above with reference to the first aspect of the invention.

BRIEF DESCRIPTION OF THE DRAWINGS

In the following the invention will be described in further detail with reference to the accompanying drawings in which.

DETAILED DESCRIPTION OF THE DRAWINGS

Figure 1:
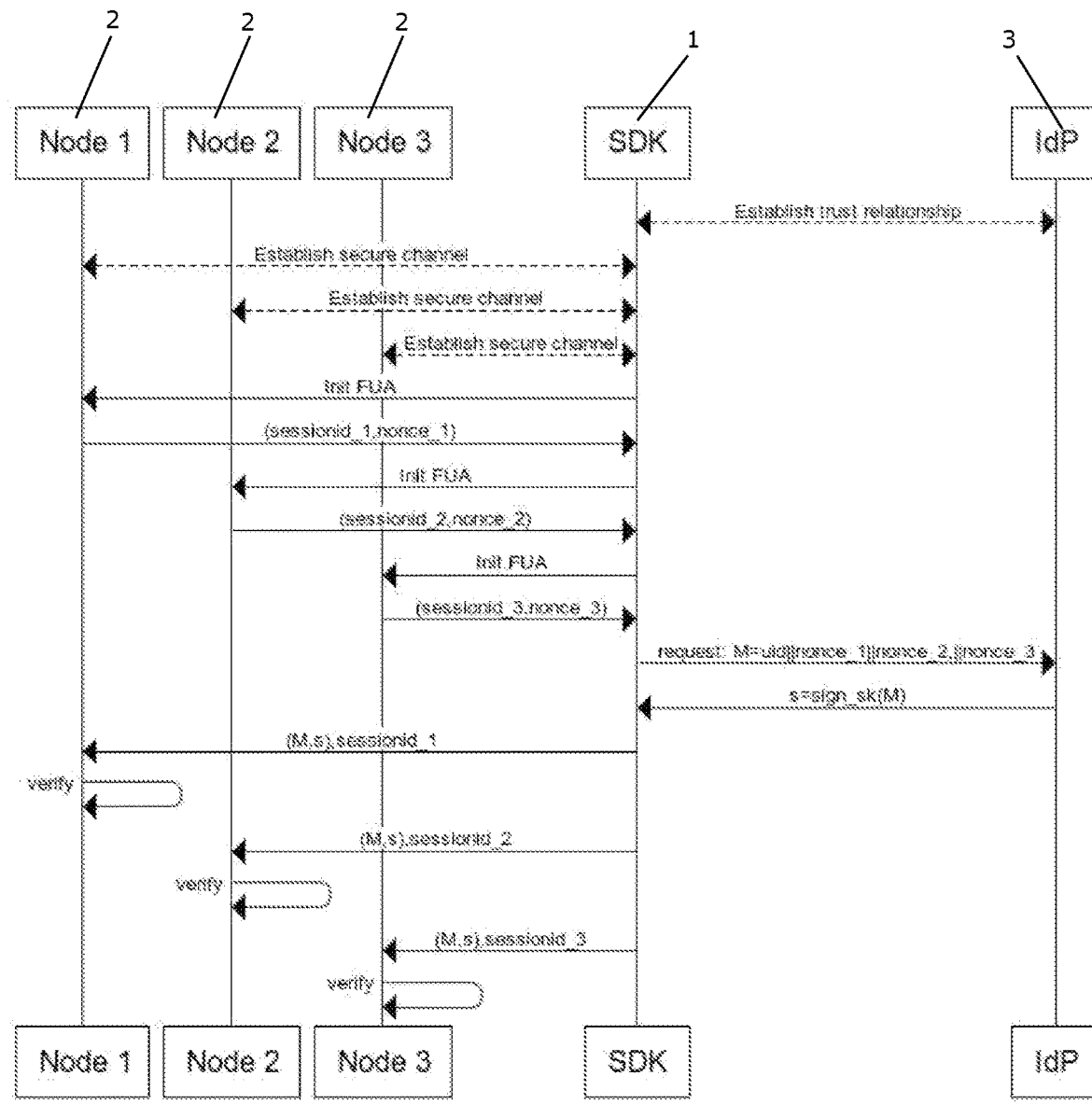
FIGS. 1-3 are diagrams illustrating various embodiments of the method according to the invention.

FIG. 1 is a diagram illustrating a method according to a first embodiment of the invention. More particularly, FIG. 1 illustrates communication among various parties while performing the method according to the first embodiment of the invention.

The parties participating in performing the method are a user application 1, a multi-node party comprising three nodes 2, and an Identity Provider 3.

We assume that initially, prior to authentication of a user, a trust relationship has been established between the nodes 2 of the multi-node application and the Identity Provider 3.

We also assume an initial trust relationship between the user application 1 and the Identity Provider 3. This trust relationship allows the user application 1 to authenticate the Identity Provider and it implies that the user holds credentials that allows the Identity Provider 3 to authenticate the user.

Finally, we assume an initial trust relationship that allows the user application 1 to authenticate each of the nodes 2. Note that, initially, we do not assume that the nodes can authenticate the user. This is the goal of the present invention.

In order to perform authentication of a user, the user application 1 initially contacts each of the nodes 2 and establishes secure, one-way authenticated channels with each node 2. In response thereto, each node 2 generates a nonce and a session ID, and returns these to the user application 1.

The user application 1 then generates a request for authentication of the user and forwards this to the Identity Provider 3. The request for authentication comprises a nonce generated from the nonces received from the nodes 2, e.g. in the form of a combination of the nonces.

In response thereto, and based on a unique identity of the user, the Identity Provider 3 generates a message, M, containing the unique identity of the user (uid), and the combined nonce. It also generates a digital signature, s, of the message M. The message, M, and the digital signature, s, are returned to the user application 1.

The user application 1 then provides the message, M, and the digital signature, s, received from the Identity Provider 3, to each of the nodes 2, along with the respective session ID's.

Each node 2 then verifies (1) that the digital signature is a valid signature of M, (2) that the received session ID matches the session ID that the node generated when it originally provided the nonce to the user application, and (3) that the message, M, is in fact based on the nonce which the node 2 originally provided to the user application 1.

The user application 1 acts as a single client towards the Identity Provider 3, and from the perspective of the Identity Provider 3, only one party, i.e. the user application 1, is authenticated. This minimises the required number of rounds in order to complete the authentication of the user, and thereby the high security of authentication by means of a multi-node party can be obtained without the drawbacks related to individual authentication towards each node 2.

The use of individual session IDs for each node and the fact that the nonce included in the signed message, M, consists of a combination of the individual nonces from each node ensure that even a malicious node cannot misuse the information it receives to authenticate towards any of the other nodes as if it was the client.

Figure 2:
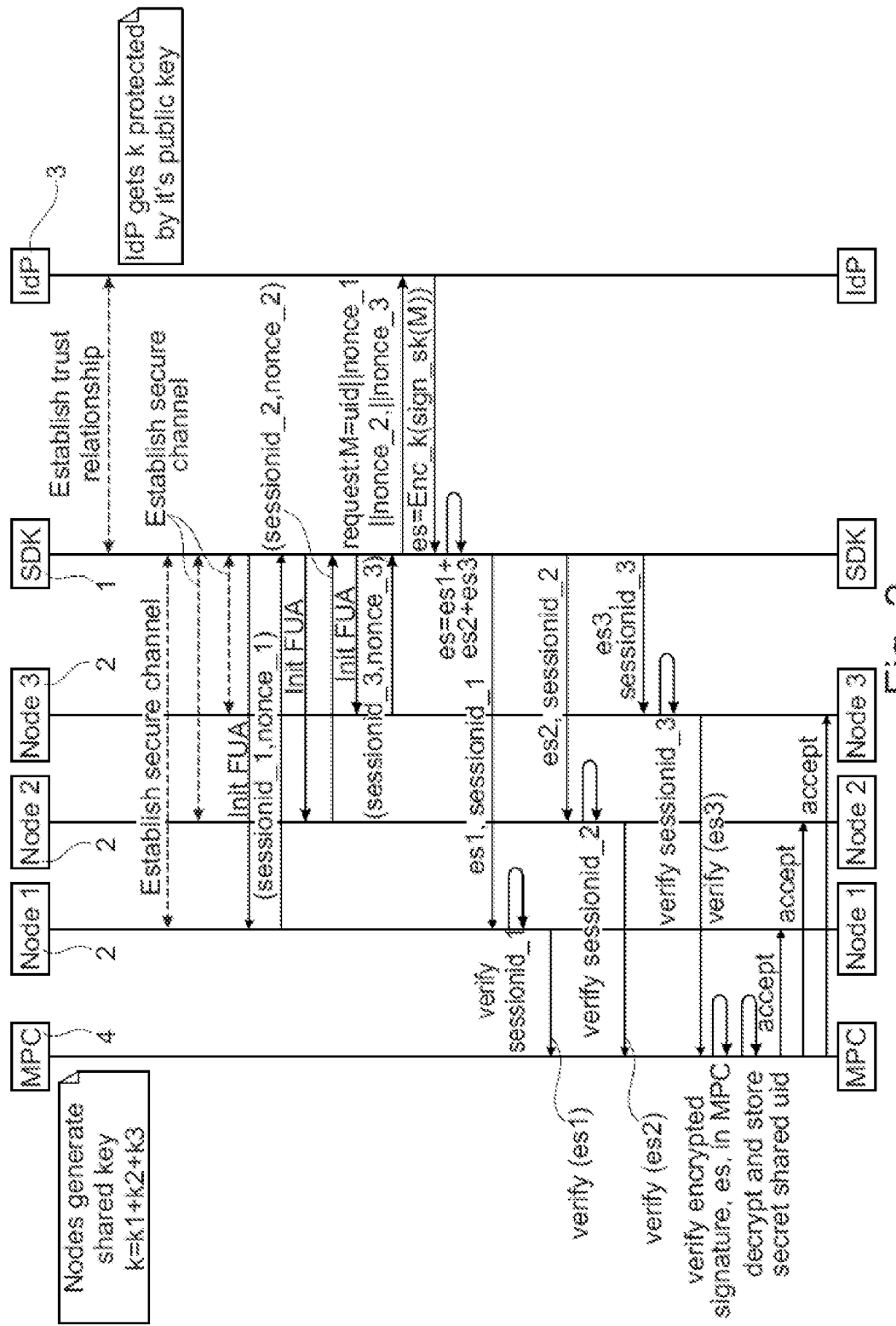

FIG. 2 is a diagram illustrating a method according to a second embodiment of the invention. The method illustrated in FIG. 2 is very similar to the method illustrated in FIG. 1, and it will therefore not be described in detail here.

However, in the method illustrated in FIG. 2, the nodes 2 of the multi-node party generate a shared encryption key, k, and the encryption key, k, is shared with the Identity Provider 3 via the established trust relationship between the user application 1 and the Identity Provider 3.

The message which is generated by the Identity Provider 3, in response to the request for authentication, is encrypted by means of the encryption key, k. Accordingly, the user application 1 receives the message in a secret form. Furthermore, upon receipt of the encrypted message, the user application 1 generates a secret sharing of the message, and provides respective shares to the nodes 2. Accordingly, each node 2 receives a secret version of the message.

The nodes 2 then perform a multi-party operation in which they verify the message. This is illustrated by MPC 4.

Accordingly, none of the nodes 2 learns the true identity of the user or any information regarding the entire message provided by the Identity Provider 3. Thereby privacy of the user is preserved.

Figure 3:
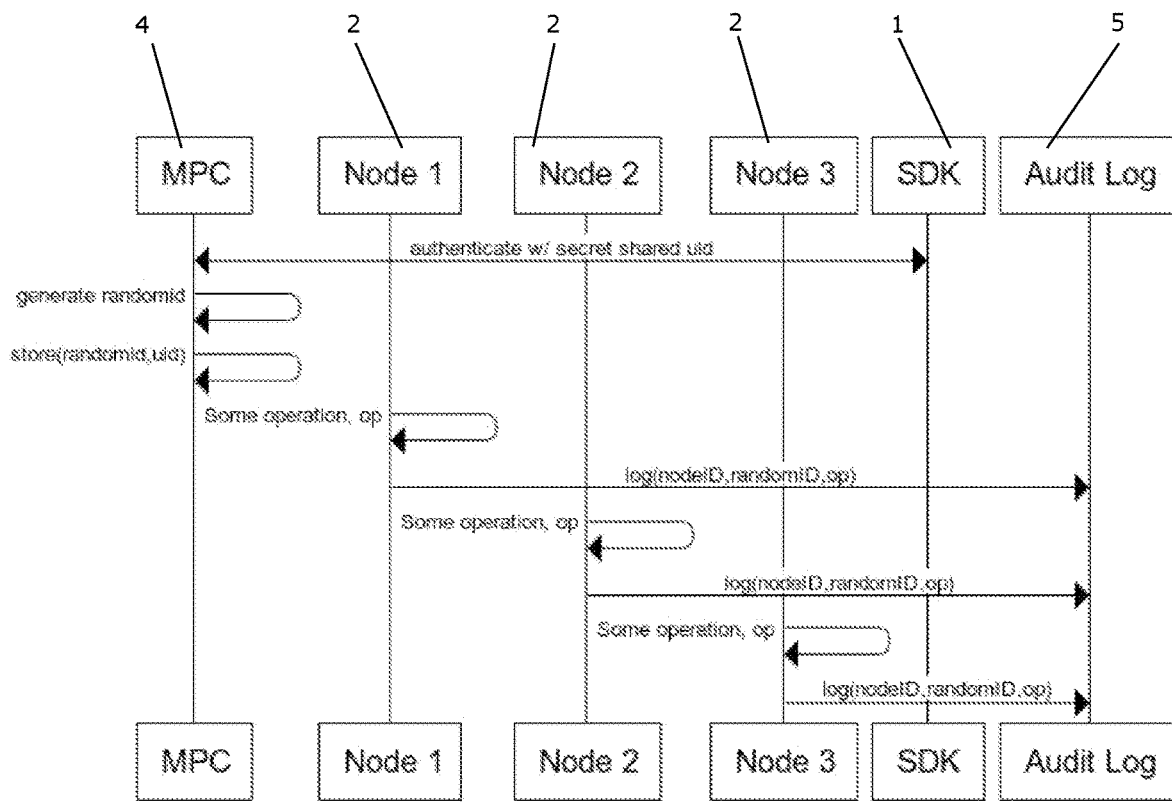

FIG. 3 is a diagram illustrating a method according to a third embodiment of the invention. More particularly, FIG. 3 illustrates an audit process performed after authentication of a user has been performed, e.g. in the manner described above with reference to FIG. 1 or FIG. 2.

An authentication process is initially performed between the user application 1 and the nodes 2 of the multi-node party, by means of a multi-party process 4. Furthermore, the nodes 2 of the multi-node party generate a random pseudonym ID for the user and stores the pseudonym ID, using a multi-party process 4.

Activities of the user are then logged by the nodes 2 of the multi-node party, and the logged activities are stored along with the respective shares of the pseudonym ID and the respective node ID in an audit log 5. An auditor may subsequently access the audit log 5 in order to perform audit.

Figure 4:
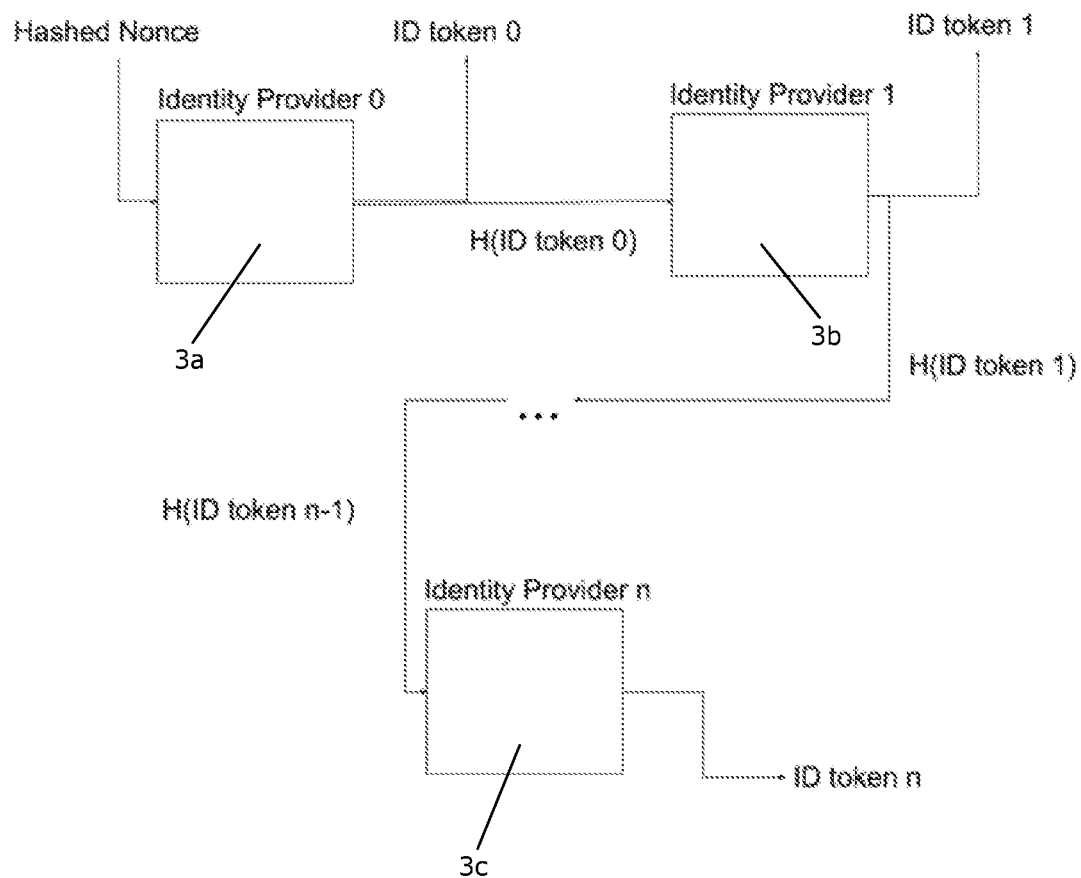
FIG. 4 is a block diagram illustrating chained authentication forming part of a method according to an embodiment of the invention.

FIG. 4 is a block diagram illustrating chained authentication forming part of a method according to an embodiment of the invention. The method could, e.g., be one of the methods illustrated in FIG. 1 or FIG. 2, and described above.

Upon receipt of nonces from respective nodes of a multi-node party, a user application generates a hashed nonce, based on the received nonces. The hashed nonce is provided to a first Identity Provider 3a along with a unique identity of the user being authenticated, in order to request authentication of the user from the first Identity Provider 3a. In response thereto the first Identity Provider 3a generates a first message in the form of a first ID token and returns this to the user application.

The user application then generates a hash of the first ID token and provides this to a second Identity Provider 3b, along with the unique identity of the user, and in order to request authentication of the user from the second Identity Provider 3b. In response thereto, the second Identity Provider 3b generates a second ID token and returns this to the user application, and the user application generates a hash of the second ID token.

The process described above is repeated, i.e. the hash of the second ID token is provided to a third Identity Provider, etc., until a chain of ID tokens for the user has been obtained from a desired number of Identity Providers. In FIG. 4 this final Identity Provider is illustrated as the n'th Identity Provider 3c.

All of the ID tokens are then provided to the nodes of the multi-node party which then verifies the chain of ID tokens as described above.

The invention claimed is:

1. A method for authentication of a user towards a multi-node party, the multi-node party comprising at least two nodes, the method comprising the steps of:
   the user contacting each of the nodes of the multi-node party, via a user application,
   each of the nodes of the multi-node party generating a nonce and returning the nonce to the user application,
   the user application requesting authentication from an Identity Provider, based on the nonces received from each of the nodes of the multi-node party and on a unique identity of the user,
   the Identity Provider generating a message, based on the request for authentication and on the nonces generated by each of the nodes, and providing the message to the user application,
   the user application providing the message in a secret form to each of the nodes of the multi-node party,
   the nodes of the multi-node party verifying the message, based on the received secret form of the message and by means of secure multi-party computation performed by the at least two nodes in cooperation, and
   authenticating the user based on the secure multi-party computation.

2. The method according to claim 1, further comprising the step of the Identity Provider encrypting the message, and providing the encrypted message to the user application, and
wherein the step of the user application providing the message in a secret form comprises providing the encrypted message to the nodes of the multi-node party.

3. The method according to claim 2, further comprising the step of the nodes of the multi-node party generating a shared encryption key, and
wherein at least the step of encrypting the message is performed by means of the shared encryption key.

4. The method according to claim 2, further comprising the step of decrypting the received message at the multi-node party, by means of secure multi-party decryption.

5. The method according to claim 1, wherein the step of the user application providing the message in a secret form to each of the nodes of the multi-node party comprises the user application generating a sharing of the message, and providing at least one share of the message to each of the nodes of the multi-node party, and
wherein the step of the nodes of the multi-node party verifying the message is performed based on the received shares.

6. The method according to claim 1, further comprising the step of storing at least part of the message at the multi-node party, in the form of a secret sharing of at least part of the message.

7. The method according to claim 1, further comprising the steps of:
each node of the multi-node party generating a session ID and returning the session ID to the user application along with the nonce,
for each of the nodes of the multi-node party, the user application providing the session ID generated by a given node of the multi-node party along with the share(s) of the message provided to that node, and
each node verifying the received session ID.

8. The method according to claim 1, further comprising the step of granting or denying access for the user to an object stored at a storage location which is accessible to the multi-node party, based on the authentication of the user and based on a set of access rights.

9. The method according to claim 1, further comprising the steps of:
deriving a sharing of a unique ID of the user from the message, and storing shares of the unique ID of the user at the nodes of the multi-node party and by means of a multi-party storing operation, and
each node logging activities of the user and storing the logged activities along with the respective share(s) of the unique user ID.

10. The method according to claim 9, further comprising the steps of:
an auditor retrieving activity information from the nodes of the multi-node party by means of a multi-party operation, and
the auditor performs audit of activities performed at the multi-node party, based on the retrieved information.

11. The method according to claim 9, further comprising the steps of:
generating a pseudonym user ID and storing the pseudonym user ID at the multi-node party and by means of a multi-party storing operation,
logging activities of the user and associating the activities and the pseudonym user ID to each other, and
each node providing information regarding node ID, pseudonym user ID and associated activities to a log.

12. The method according to claim 1, wherein the step of the user application requesting authentication from an Identity Provider comprises the steps of:
the user application requesting authentication of the user from a first Identity Provider, based on the nonces received from the nodes of the multi-node party and on a unique identity of the user,
the first Identity Provider generating a first message, based on the request for authentication and providing the first message to the user application,
the user application requesting authentication of the user from a second Identity Provider, based on the first message received from the first Identity Provider and on a unique identity of the user, and
the second Identity Provider generating a second message, based on the request for authentication and providing the second message to the user application.

13. The method according to claim 12, wherein the step of the user application requesting authentication from an Identity Provider further comprises the user application requesting authentication of the user from at least a third Identity Provider, based on the second message and on a unique identity of the user, thereby creating a chain of messages.

14. The method according to claim 1, wherein the step of the user application requesting authentication from an Identity Provider comprises the steps of:
the user application requesting authentication of a first user from the Identity Provider, based on the nonces received from the nodes of the multi-node party and on a unique identity of the first user,
the Identity Provider generating a first message, based on the request for authentication of the first user and providing the first message to the user application,
the user application requesting authentication of a second user from the Identity Provider, based on the first message received from the Identity Provider and on a unique identity of the second user, and
the Identity Provider generating a second message, based on the request for authentication of the second user and providing the second message to the user application.

15. The method according to claim 14, wherein the step of the user application requesting authentication from an Identity Provider further comprises the user application requesting authentication of at least a third user from the Identity Provider, based on the second message and on a unique identity of the third user, thereby creating a chain of messages.

16. A method for authentication of a user towards a multi-node party, the multi-node party comprising at least two nodes, the method comprising the steps of:
the user contacting each of the nodes of the multi-node party, via a user application,
each of the nodes of the multi-node party generating a nonce and returning the nonce to the user application,
the user application generating a combined nonce, based on the nonces received from each of the nodes of the multi-node party, and requesting authentication from an Identity Provider based on the combined nonce and on a unique identity of the user,
the Identity Provider generating a message, based on the request for authentication and on the combined nonce, and providing the message to the user application,
the user application providing the message to each of the nodes of the multi-node party, the nodes of the multi-node party verifying the message, based on the received message and by means of a verifying operation, and authenticating the user based on the verifying operation.

17. The method according to claim 16, wherein the step of the user application requesting authentication from an Identity Provider comprises the steps of:

the user application requesting authentication of the user from a first Identity Provider, based on the combined nonce and on a unique identity of the user, the first Identity Provider generating a first message, based on the request for authentication and providing the first message to the user application, the user application requesting authentication of the user from a second Identity Provider, based on the first message received from the first Identity Provider and on a unique identity of the user, and the second Identity Provider generating a second message, based on the request for authentication and providing the second message to the user application.

18. The method according to claim 17, wherein the step of the user application requesting authentication from an Identity Provider further comprises the user application requesting authentication of the user from at least a third Identity Provider, based on the second message and on a unique identity of the user, thereby creating a chain of messages.

19. The method according to claim 16, wherein the step of the user application requesting authentication from an Identity Provider comprises the steps of:

the user application requesting authentication of a first user from the Identity Provider, based on the combined nonce and on a unique identity of the first user, the Identity Provider generating a first message, based on the request for authentication of the first user and providing the first message to the user application, the user application requesting authentication of a second user from the Identity Provider, based on the first message received from the Identity Provider and on a unique identity of the second user, and the Identity Provider generating a second message, based on the request for authentication of the second user and providing the second message to the user application.

20. The method according to claim 19, wherein the step of the user application requesting authentication from an Identity Provider further comprises the user application requesting authentication of at least a third user from the Identity Provider, based on the second message and on a unique identity of the third user, thereby creating a chain of messages.

* * * * *